E. FRIESS.
PORTABLE PIPE VISE STAND.
APPLICATION FILED NOV. 23, 1916.
1,252,423.
Patented Jan. 8, 1918.
2 SHEETS—SHEET 1.
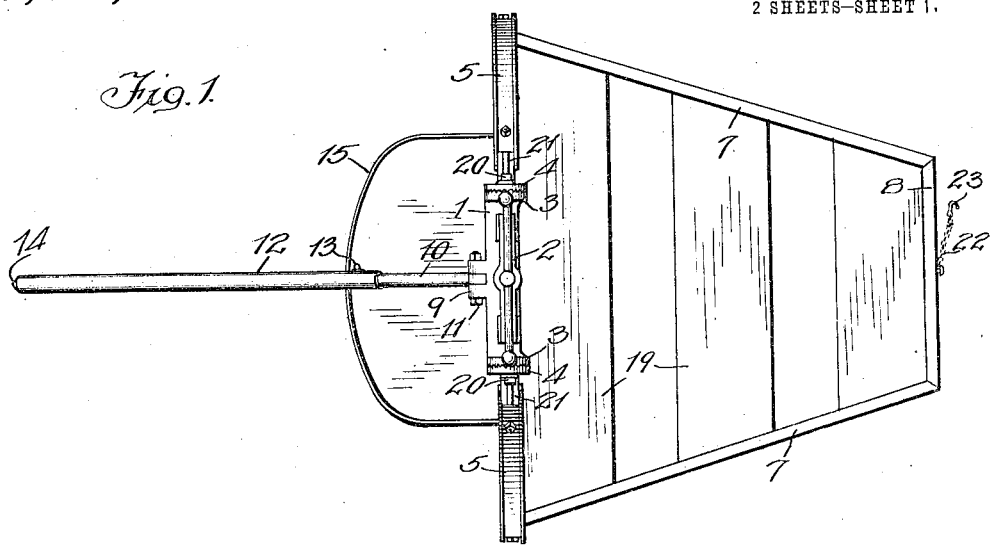
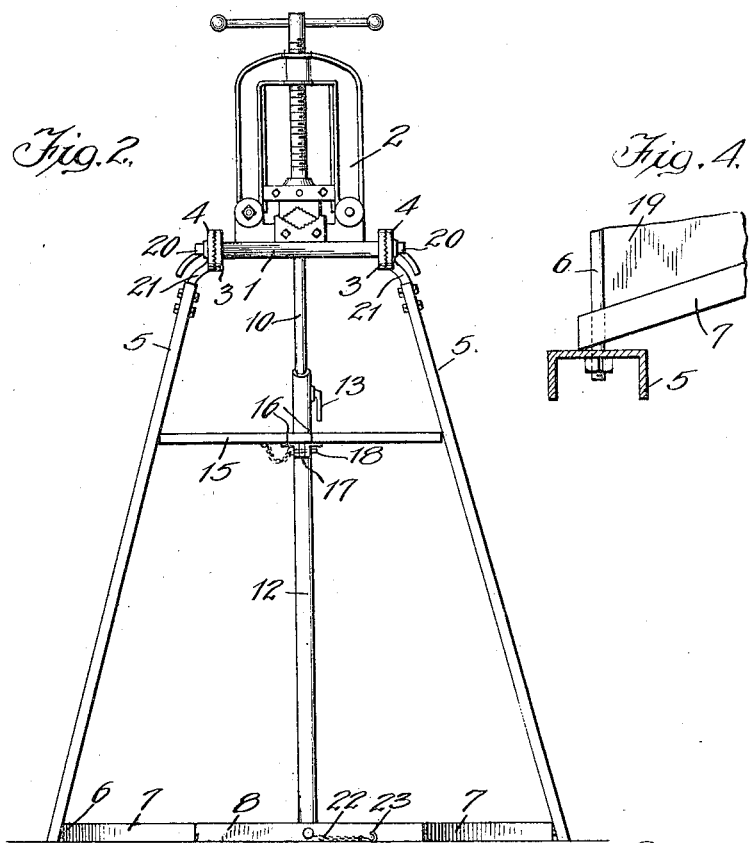
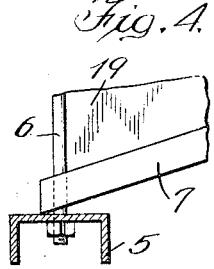

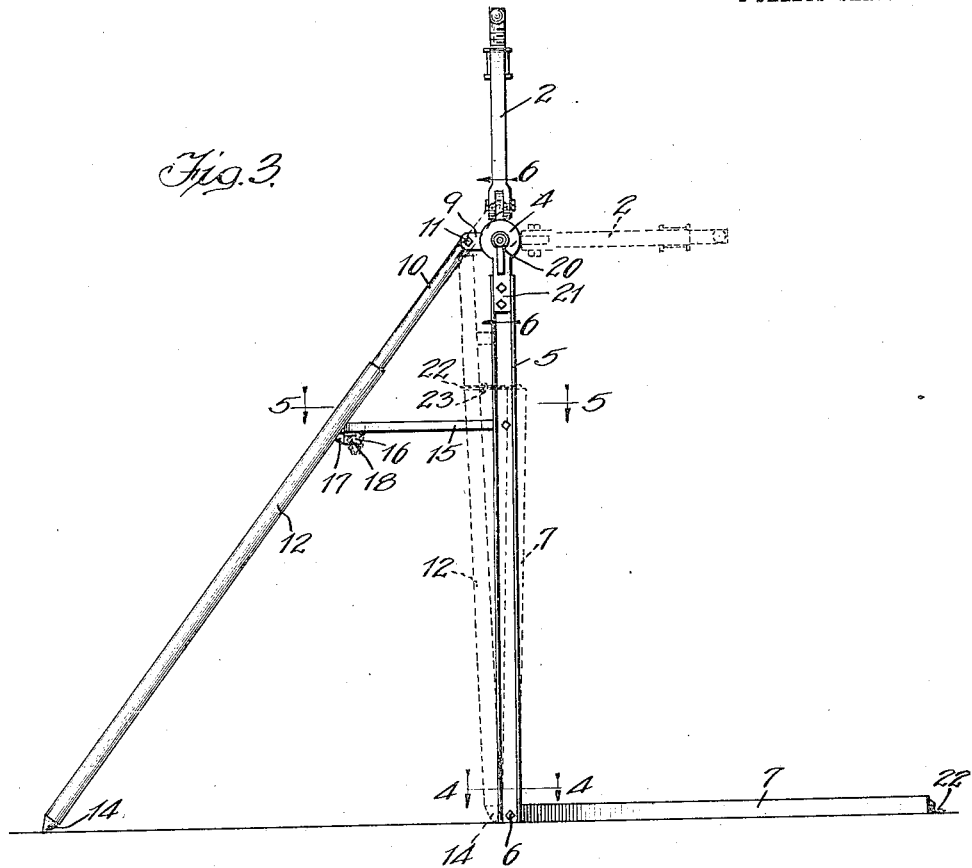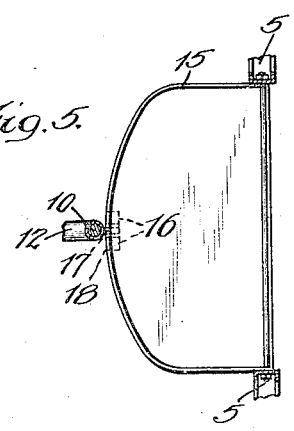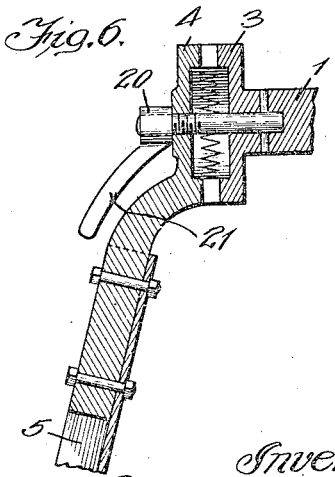

United States Patent Office.

EMIL FRIESS, OF CHICAGO, ILLINOIS.

PORTABLE PIPE-VISE STAND.

1,252,423. Specification of Letters Patent. Patented Jan. 8, 1918.

Application filed November 23, 1916. Serial No. 133,049.

*To all whom it may concern:*

Be it known that I, EMIL FRIESS, subject of the Emperor of Germany, residing at Chicago, in the county of Cook and State of Illinois, have invented certain new and useful Improvements in Portable Pipe-Vise Stands; and I do hereby declare the following to be a full, clear, and exact description of the invention, such as will enable others skilled in the art to which it appertains to make and use the same.

This invention relates to improvements in vice-supports, and has for its particular object to provide a collapsible portable vise support particularly adapted for use by mechanics at various places where work is required to be done, and which is so constructed as to be light and durable, and to permit of ready adjustment of the vise supported thereby to occupy positions best adapting it to the needs of the mechanic.

The invention consists in the features of construction and combinations of parts hereinafter fully described and particularly claimed.

In the accompanying drawings illustrating a suitable embodiment of the invention:

Figure —1— is a top plan view of a collapsible portable vise support constructed in accordance with the invention.

Fig. —2— is a view in front elevation of the same.

Fig. —3— is a view in side elevation thereof.

Figs. —4— and —5— are respectively fragmentary detail plan sections on the lines 4—4 and 5—5 respectively, of Fig. —3—.

Fig. —6— is a fragmentary detail vertical section on the line 6—6 of Fig. —3—.

My said device is particularly intended and adapted for use by plumbers, steam fitters and the like, who are required to cut and thread pipes at the place of installation of plumbing and heating systems, and fit valves, elbows and other pipe fittings thereto. I have, therefore, in the accompanying drawings, illustrated my said device as carrying a pipe vise, though obviously a carpenter's or cabinetmaker's vise, or any other suitable clamping or work-engaging means may be substituted for the pipe-vise without departing from the invention.

The device comprises a shaft or rotatable member 1 upon which the vise, or similar tool, 2 is rigidly mounted, and of which it may comprise the base or an integral part. At the ends of the member 1 are trunnions threaded at their extreme ends. Rigid with said trunnions are the serrated-faced disks 3, which are adapted to be engaged by similar disks 4 slidable on the said trunnions, and which are rigid with the standards 5 upon the upper ends of which they are mounted. The said standards 5 are made of channel iron or other similar suitable material having great rigidity in proportion to weight, and are preferably made to diverge toward their lower or supporting ends. At their lower ends said standards 5 are connected together by a cross-rod 6. Secured at one end to said rod 6 is a frame 7 consisting of two side rails and an end rail 8, said side rails converging toward each other at their juncture with the end rail 8, the angle of convergence of said side rails being substantially identical with the angle of convergence of the standards 5 so that when the frame 7 is turned on the rod 6 as a pivot, the said side-rails of said frame 7 will lie between and extend substantially parallel to the standards 5.

The shaft or supporting member 1 is provided with a pair of lugs 9 between which one end of a rod or tube 10 is pivotally secured by means of the bolt 11. The said rod 10 fits telescopically within the tubular extension member 12, and is held against longitudinal movement therein by means of the set-screw 13 or similar suitable device for locking said parts 10 and 12 against relative longitudinal movement. The lower end of the extension member 12 terminates in a sharp point 14 which is adapted to obtain a relatively firm hold in the floor, and may be equipped with any other suitable means for firmly securing it to the floor to prevent slippage thereof. The said standards 5 and telescopically extensible leg 12 and the member 1 constitute a relatively rigid tripod.

Pivotally secured at its ends to the standards 5 is a U-shaped yoke or brace 15 which is provided midway between its ends with a pair of projections 16 between which a projection 17 on the extension member 12 is adapted to be received, the parts being secured together by means of the pin 18 passing through perforations in said projections 16 and 17. Bordered by the yoke or brace 15 is a board or plate adapted to support tools and the like when the device is in use.

The frame 7 is provided with several cross-pieces 19 consisting preferably of boards upon which the mechanic may stand in doing his work, thereby holding the lower ends of the standards 5 rigidly in place, and thus preventing slippage of the base portion of the entire vise or other tool support. The latter is thus rendered sufficiently rigid for all purposes for which it is ordinarily adapted to be used, it being obvious that force exerted by the mechanic standing on the platform composed of the cross-pieces 19, cannot at any time be sufficient to tip the tripod in the direction substantially in the plane of the standards 5 as might happen in threading pipes.

By means of the pivotal mounting of the vise-supporting member 1 the latter may be adjusted to occupy any position desired, such for example as that shown in dotted lines in Fig. —3—. It is turned to this position by first rotating the nuts 20 threaded on the outer ends of the shaft 1 by means of the handles 21 to effect a separation of the disks 3 and 4, whereupon the member 1 may be swung relatively to the standards 5 to become positioned at any angle desired, and by then again engaging the disks 3 and 4 firmly with each other will be securely held in such position.

When it is desired to move the device, the yoke or brace 15 is released from engagement with the extension member 12 and permitted to drop so that it will lie in the plane of the standards 5. The frame 7 is then swung so that the side rails thereof lie between the standards 5. The members 10 and 12 are first moved telescopically relatively to each other so as to shorten the same to correspond in length with the distance from the pivotal connection thereof with the member 1 to the lower end of the standards 5, and said leg composed of said member is then swung to the position shown in dotted lines in Fig. —3—. Mounted upon the end rail 8 of the frame 7 is a chain 22 equipped with a hook 23 which is passed around the extension member 12 when the latter is positioned as shown in dotted lines in Fig. —3—, thereby securing it and the frame 7 and yoke 15 against pivotal movement relatively to the standards 5. The device thus occupies a very small space and may be readily carried from place to place. The standards 5, instead of being vertically disposed, as shown in Figs. —1— and —2—, may be inclined away from the frame 7, for example, so that the plane of the standards 5 is perpendicular to the axis of a long length of pipe resting at one end on the floor and engaged at its other end portion in the vise 2, this being obviously very advantageous.

While I have illustrated the preferred embodiment of my invention in the accompanying drawings, it will be obvious, of course, that said embodiment may be changed and varied to adapt it to different purposes without departing from the invention as defined in the appended claims.

I claim as my invention:

1. A tool-support comprising a platform, a tripod having two of its legs pivotally secured at their lower ends to one end of said platform, a rotatable member mounted in the upper ends of said legs, coacting manually operable clutch-members carried by said rotatable member and said legs respectively for holding said rotatable member rigidly in any position to which it is turned, and a third leg pivotally secured to said rotatable member.

2. A tool-support comprising a platform, a tripod having two of its legs pivotally secured at their lower ends to one end of said platform, a rotatable member mounted in the upper ends of said legs, coacting manually operable clutch-members carried by said rotatable member and said legs respectively for holding said rotatable member rigidly in any position to which it is turned, and a third leg adjustable in length pivotally secured to said rotatable member.

3. A tool-support comprising a platform, a tripod having two of its legs pivotally secured at their lower ends to one end of said platform, a rotatable member mounted in the upper ends of said legs, coacting manually operable clutch-members carried by said rotatable member and said legs respectively for holding said rotatable member rigidly in any position to which it is turned, a third leg pivotally secured to said rotatable member, and a brace-member pivotally secured to said first-named legs between their ends and adapted to be engaged with said third leg between the ends of the latter for holding all of said legs against relative pivotal movement.

4. A tool-support comprising a platform, a tripod having two of its legs pivotally secured at their lower ends to one end of said platform, a rotatable member mounted in the upper ends of said legs, coacting manually operable clutch-members carried by said rotatable member and said legs respectively for holding said rotatable member rigidly in any position to which it is turned, said legs converging from their lower to their upper ends, and said platform having convergent side-edges and adapted to be received between said legs when turned on said pivotal connection for folding said support, a third leg adjustable in length pivotally secured to said rotatable member, and a brace-member having inclined side edges pivotally secured to said first-named legs between their ends and adapted to be engaged with said third leg between the ends of the latter for holding all of said legs against relative pivotal movement, said brace-member adapted to be received between said first-named legs when the support is folded.

5. A tool-support comprising a platform, a tripod having two of its legs pivotally secured at their lower ends to one end of said platform, a rotatable member mounted in the upper ends of said legs, coacting manually operable clutch-members carried by said rotatable member and said legs respectively for holding said rotatable member rigidly in any position to which it is turned, said legs converging from their lower to their upper ends, and said platform having convergent side-edges and adapted to be received between said legs when turned on said pivotal connection for folding said support, a third leg adjustable in length pivotally secured to said rotatable member, and a brace-member having inclined side edges pivotally secured to said first-named legs between their ends and adapted to be engaged with said third leg between the ends of the latter for holding all of said legs against relative pivotal movement, said brace-member adapted to be received between said first-named legs when the support is folded, and a fastening device carried by one of said parts pivotally engaged with said first-named legs and adapted to engage the other thereof for holding all parts of said support securely in relative position when the said device is folded up.

In testimony whereof I have signed my name in presence of two subscribing witnesses.

EMIL FRIESS.

Witnesses:
M. M. BOYLE,
GUST JOHNSON.

Copies of this patent may be obtained for five cents each, by addressing the "Commissioner of Patents, Washington, D. C."